(12) United States Patent
Pontillo et al.

(10) Patent No.: US 9,306,933 B2
(45) Date of Patent: Apr. 5, 2016

(54) ENSURING NETWORK CONNECTION SECURITY BETWEEN A WRAPPED APP AND A REMOTE SERVER

(71) Applicant: Mocana Corporation, San Francisco, CA (US)

(72) Inventors: Michael Scott Pontillo, Roseville, CA (US); James Blaisdell, Novato, CA (US); Brian H. Pescatore, Natick, MA (US)

(73) Assignee: Mocana Corporation, San Francisco, CA (US)

( * ) Notice: Subject to any disclaimer, the term of this patent is extended or adjusted under 35 U.S.C. 154(b) by 0 days.

(21) Appl. No.: 13/924,194

(22) Filed: Jun. 21, 2013

(65) Prior Publication Data

US 2013/0291086 A1 Oct. 31, 2013

Related U.S. Application Data

(63) Continuation-in-part of application No. 13/875,151, filed on May 1, 2013, which is a continuation-in-part of application No. 13/025,994, filed on Feb. 11, 2011, now Pat. No. 8,549,656.

(60) Provisional application No. 61/662,555, filed on Jun. 21, 2012.

(51) Int. Cl.
| | |
|---|---|
| *H04L 29/00* | (2006.01) |
| *H04L 29/06* | (2006.01) |
| *H04W 12/02* | (2009.01) |
| *G06F 21/51* | (2013.01) |
| *H04W 4/00* | (2009.01) |

(52) U.S. Cl.
CPC ............ *H04L 63/0823* (2013.01); *G06F 21/51* (2013.01); *H04L 63/0272* (2013.01); *H04W 4/00* (2013.01); *H04W 12/02* (2013.01); *H04L 63/0227* (2013.01)

(58) Field of Classification Search
CPC combination set(s) only.
See application file for complete search history.

(56) References Cited

U.S. PATENT DOCUMENTS

| | | | |
|---|---|---|---|
| 6,920,567 B1 * | 7/2005 | Doherty et al. | 726/22 |
| 7,941,700 B2 | 5/2011 | Schlesinger et al. | |

(Continued)

OTHER PUBLICATIONS

Matt Hamblen, "New Version of Mobile Management Released by MobileIron," Computerworld Online, http://www.computerworld.com/s/article/9184159/New_version_of_mobile_management_released_by_MobileIron, Sep. 9, 2010.

(Continued)

*Primary Examiner* — Ghazal Shehni
(74) *Attorney, Agent, or Firm* — Beyer Law Group LLP

(57) ABSTRACT

A network connection between an app on a mobile device and a remote server is either enabled or denied based on whether a security wrapped app can verify that the connection is with a known and trusted server. The wrapped app uses a socket interception layer injected into the app code along with a trust store, also part of the wrapped app to determine whether a network connection attempted by the app should be allowed. The layer buffers relevant function calls from the app by intercepting them before they reach the device operating system. If the layer determines that a network connection is attempted, then it snoops the negotiation phase data stream to discern when the server sends a certificate to the app. It obtains this certificate and compares it to data in the trust store and makes a determination of whether the server is known and trusted.

2 Claims, 11 Drawing Sheets

(56) References Cited

U.S. PATENT DOCUMENTS

| | | | |
|---|---|---|---|
| 8,095,786 | B1 | 1/2012 | Kshirsagar et al. |
| 8,190,785 | B2 | 5/2012 | Hill et al. |
| 2006/0004868 | A1 | 1/2006 | Claudatos et al. |
| 2006/0271921 | A1 | 11/2006 | Cronce et al. |
| 2007/0106958 | A1 | 5/2007 | Kumashio |
| 2007/0136207 | A1 | 6/2007 | Davydov |
| 2007/0192864 | A1* | 8/2007 | Bryant et al. .......... 726/23 |
| 2007/0245409 | A1 | 10/2007 | Harris et al. |
| 2008/0047023 | A1 | 2/2008 | Lam et al. |
| 2010/0223498 | A1 | 9/2010 | Schlesinger et al. |
| 2011/0239306 | A1 | 9/2011 | Avni et al. |
| 2012/0259909 | A1 | 10/2012 | Bachelor et al. |

OTHER PUBLICATIONS

U.S. Office Action dated Oct. 18, 2012 from U.S. Appl. No. 13/025,994.
Nukona App Center, "Everything You Need to Secure, Deploy and Manage Your Apps on Personal Devices", https://www.nukona.com/products, Jul. 7, 2011.
Good Technology, Inc., "Taking Secure Steps to Enterprise Mobility—On the Most Popular Devices", http://www.good.com/products, Jul. 7, 2011.
Lookout Mobile Security, https://www.mylookout.com/download, Apr. 2010.
International Search Report dated May 23, 2012 from International Application No. PCT/US12/24080.
Written Opinion dated May 23, 2012 from International Application No. PCT/US12/24080.
U.S. Final Office Action dated May 21, 2013 from U.S. Appl. No. 13/025,994.
Android Community, "Amazon App Store Lures You in With Free Apps, Makes You Stay if You Want to Keep Them", http://androidcommunity.com/amazon-app-store-lures-you-in-with-free-apps-makes-you-stay-if-you-want-to-keep-them-20110614/?utm_medium=referral&utm_source=pulsenews, pp. 1-2 , Jul. 13, 2011.
Notice of Allowance dated Aug. 27, 2013 from U.S. Appl. No. 13/025,994.
U.S. Office Action dated Oct. 9, 2014 from U.S. Appl. No. 13/875,151.
Notice of Allowance dated Oct. 7, 2014 from U.S. Appl. No. 13/829,942.
Notice of Allowance dated Dec. 16, 2014 from U.S. Appl. No. 13/875,151.
Chinese Office Action dated Jun. 3, 2015 from Chinese Application No. 201280008590.1.

* cited by examiner

ENSURING NETWORK CONNECTION SECURITY BETWEEN A WRAPPED APP AND A REMOTE SERVER

CROSS-REFERENCE TO RELATED APPLICATIONS

This application claims priority under U.S.C. §119(e) to U.S. Provisional Application No. 61/662,555 filed Jun. 21, 2012, entitled "PROTECTING NETWORK CONNECTIONS AND DATA TRAFFIC TO AND FROM AN APPLICATION ON A DEVICE". This application is also a Continuation-in-Part which claims priority under 35 U.S.C. §120 to pending U.S. patent application Ser. No. 13/875,151 filed May 1, 2013, entitled "CREATING A VIRTUAL PRIVATE NETWORK (VPN) FOR A SINGLE APP ON AN INTERNET-ENABLED DEVICE OR SYSTEM", which is a Continuation-in-Part of U.S. patent application Ser. No. 13/025,994, filed Feb. 11, 2011, entitled "SECURING AND MANAGING APPS ON A DEVICE". All applications are hereby incorporated by reference in their entirety.

BACKGROUND OF THE INVENTION

1. Field of the Invention

The present invention relates to software, network communications, and mobile devices. More specifically, it relates to security of apps and associated data running on mobile devices and connecting to remote servers.

2. Description of the Related Art

Application security is becoming increasingly important, especially applications on mobile devices, commonly referred to as apps. Often, these apps have to communicate with a remote server, such as work-related or employer-owned apps on a user's personal device. Many apps are now using Transport Layer Security (TLS), (also referred to as the Secure Socket Layer or SSL) for establishing network connections which may be used for communication with external components. Other protocols and standards are also being used for communication between an app on a device and a remote server. Note that the means for communication, whether TLS or another protocol, is at the app level, rather than at the device level. However, while TLS is a relatively secure means for communicating, there are certain ways to subvert or undermine an TLS connection. For example, a hacker or unauthorized party may be able to convince a certificate authority to sign off on a false certificate which appears authentic. Thus, a hostile party may be able to obtain a false certificate and pretend to be from a well-known and trusted company. This false certificate can then be used to subvert a TLS connection with an app on a mobile device, thereby threatening the app, data, the device operating system, and potentially the device network. It would be desirable to have greater protection for apps and associated data on mobile devices; that is, provide better protective measures at the app layer rather than at the device (physical, operating system, or network layers). Such protective measures should execute with TLS connections and should also be used with non-TLS clients.

SUMMARY OF THE INVENTION

In one aspect of the present invention, method of enabling a network connection between an app on a mobile device and a remote server is described. An app on a mobile device is wrapped, thereby making it secure on the device. By wrapping the app, a sockets interception layer is injected into the app. This layer resides on top of the app-dedicated IP stack within the wrapped app. Also injected into the app is a trust store, also referred to as a certificate store. The method begins with the sockets interception layer intercepting function calls, such as reads and writes, from the app that would normally go to the operating system. Thus, such function calls from the app do not go to the operating system of the mobile device.

The sockets interception layer determines whether an app is attempting to make a network connection by examining function calls and buffering those that are considered relevant. In one embodiment, a function call is considered relevant if it is to or from a socket that was opened for use as an Internet connection and if the socket is a stream-based socket. As noted, the sockets interception layer observes or examines the data stream between the app and the remote server. It buffers all function calls that are considered relevant, that is, have to do with communicating with a remote server. The layer determines whether the app is attempting to make a connection with a remote server. If it is not, then the normal operations of the app continue. If it is, the sockets interception layer discerns the certificate sent from the remote server, since at this stage it knows that the app is attempting to connect to a server. In one embodiment, it can do this by snooping the data stream during the negotiation phase (handshaking phase), looking for certain types of messages, and knowing when to expect a certificate from the server. The sockets interception layer of the app obtains the certificate and transmits it to or compares it to the contents of the trust store. For example, it may check to see if the certificate is from a known and trusted certificate authority. By doing this, the wrapped app itself can determine whether it can trust the server, that is, is the server a known entity that the app (and the device) can trust. If it is, then the connection is allowed to be made with the server and post-negotiation data (i.e., normal app-related data) can then be transmitted to and from the app.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Figure 1A:
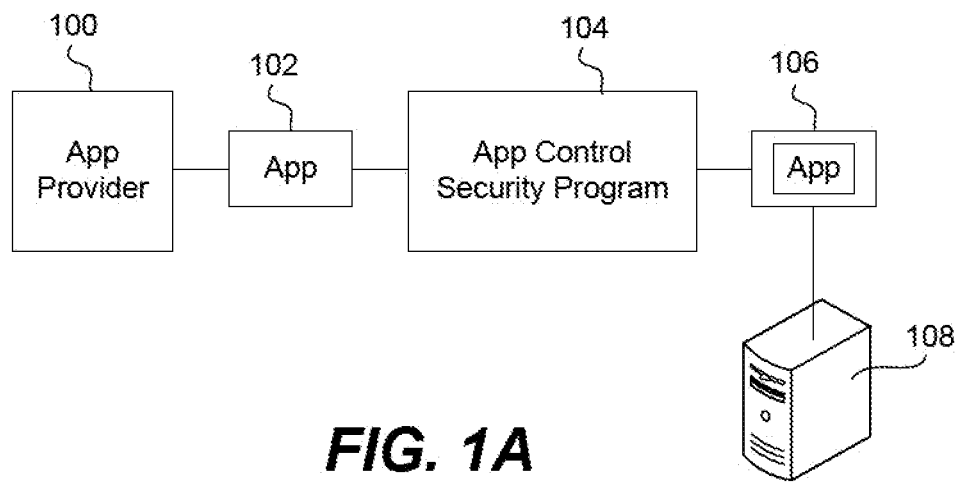
FIG. 1A is a block diagram showing an overview of the app control process of the present invention.

Example embodiments of an application security process and system are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and system for preventing device software applications from infecting or otherwise damaging a device, in particular, a mobile device, are described in the various figures. These types of applications, used often on a variety of mobile devices, such as smart phones, tablet computers, gaming devices, and portable computing devices are commonly referred to as "apps." These apps may also be downloaded on to non-mobile devices, such as TVs, computers, automobiles, and other emerging smart device categories. Methods and systems described are not intended to be limited to operation on mobile devices. These device programs or apps have proliferated and are now very prevalent. Currently, apps are typically written in either Java or C. The methods and systems described herein may be applied to apps written in either or to apps written in other languages for different platforms. Most apps, if not all, have to communicate with the mobile device's operating system to get a specific service that the app needs in order to perform its intended function and this service is usually only available from the operating system. A common example of such a service used is GPS to get the location of the device which the app may need. However, because of this exposure, apps are a vulnerability for the device and pose a security and privacy risk for the user. Companies want to be able enforce a centralized policy to control and secure access to its data and software. This is also true for end users (i.e., individuals, home users, and the like). It enables enterprise IT departments to maintain governance of corporate data. The methods described below provide a centralized way to control security with respect to apps that are downloaded onto mobile devices, where the devices are either an employee's personal phone or an employer's phone, so that those apps do not pose a security threat. Various embodiments of the invention may also be used by parents and individuals (i.e., in home or non-work environments) to ensure that their personal mobile devices are safe from malware and may also be used to apply controls, such as on usage. Embodiments of the app control software of the present invention may also be used for mobile device data protection and back-up and for application-level telemetry.

FIG. 1A is a block diagram showing an overview of the app control process of the present invention. It is a generic description of one process without being tied to a specific configuration or environment. An app 102 is provided by app provider 100 which can be any type of entity (individual, software developer, employer, etc.). It is generally unprotected and the only security surrounding it is provided by the operating system. The only shield and checking done on how it executes on the device once loaded is provided by the operating system.

The present invention enables additional security of the apps that is not provided by the device's operating system. A security application program 104 is applied to app 102. Or the app 102 is input to program 104, which may be supplied by a third-party app security provider. In one embodiment, security application program 104 has a policy manager and a policy wrapper which may be in different locations. They are described in greater detail in FIG. 2. Once security program 104 has been applied to app 102, the app is wrapped with a security layer so that the device is protected. It is shown as secured app 106. In one embodiment, secured app 106 is then downloaded onto a mobile device 108, such as a smart phone or tablet computer, where it executes securely without risking damage to device 108. Another benefit is that secured app 106 may also be managed by the company or other entity that is providing the app to the user, such as an employer providing the app to an employee. For example, if the user leaves the company, the company may automatically delete the app and any related data from the device. In another example, a parent may be able to limit the apps used by another person (e.g., a child) or to limit the amount of time, e.g., 10 minutes a day or limit which Web sites may be accessed by an app. Or, a parent is concerned that an app is leaking a child's location to unknown third parties. There may be numerous other examples. As noted, FIG. 1A is intended to show the general process of securing an app and downloading it onto a device. Note that in this embodiment, app 102 is not made secure from causing harm to the device after it is downloaded onto the device, but before. In another embodiment, the app is secured after it is downloaded onto the device, but before it can interact with the operating system.

Figure 1B:
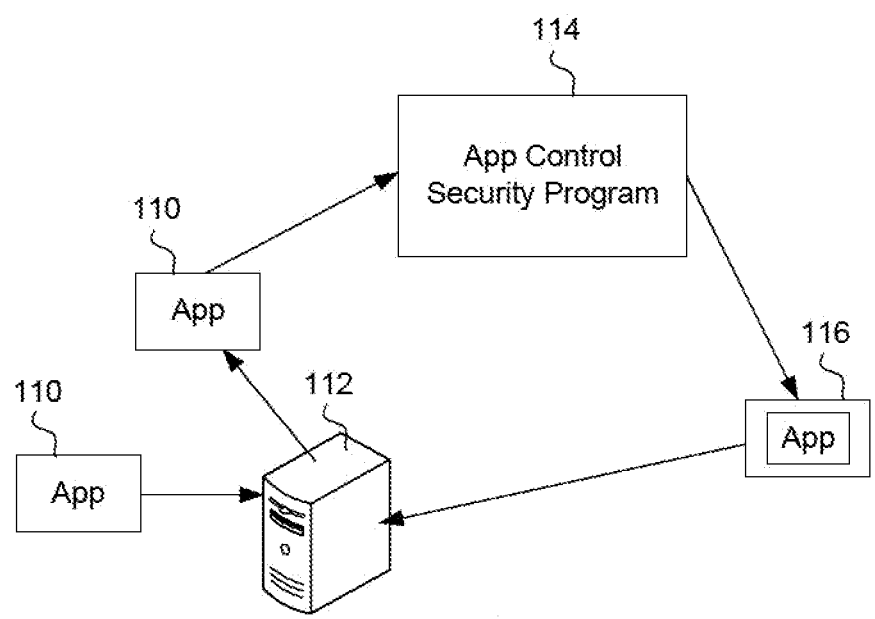
FIG. 1B is a block diagram showing an alternative embodiment of an app control process of the present invention.

FIG. 1B is a block diagram showing an alternative embodiment. An unsecured app 110 (also supplied by an app provider) is downloaded onto mobile device 112. In this embodiment, however, there may be a specially designed app on device 112 that blocks the actual installation of unsecured app 110. The special app (not shown) redirects unsecured app 110 to an app security program 114. The unsecured app 110 is wrapped in a security policy, the resulting app shown as secured app 116. It is then downloaded and allowed to be installed on device 112 by the special app. In this manner, an individual or home user, for example, who wants to protect her phone from security threats posed by apps, can have apps made secure (wrapped) by a third-party service or by her mobile phone carrier, to mention only two examples, before they are downloaded on to her phone. It should be noted that this security wrapping can be done to an app regardless of where the user downloads the app from. It may also be noted that in FIGS. 1A and 1B, the network and connections between the components and software are shown generically. The transmissions are primarily over the Internet (not shown) but may also be within a private network or both.

Figure 2:
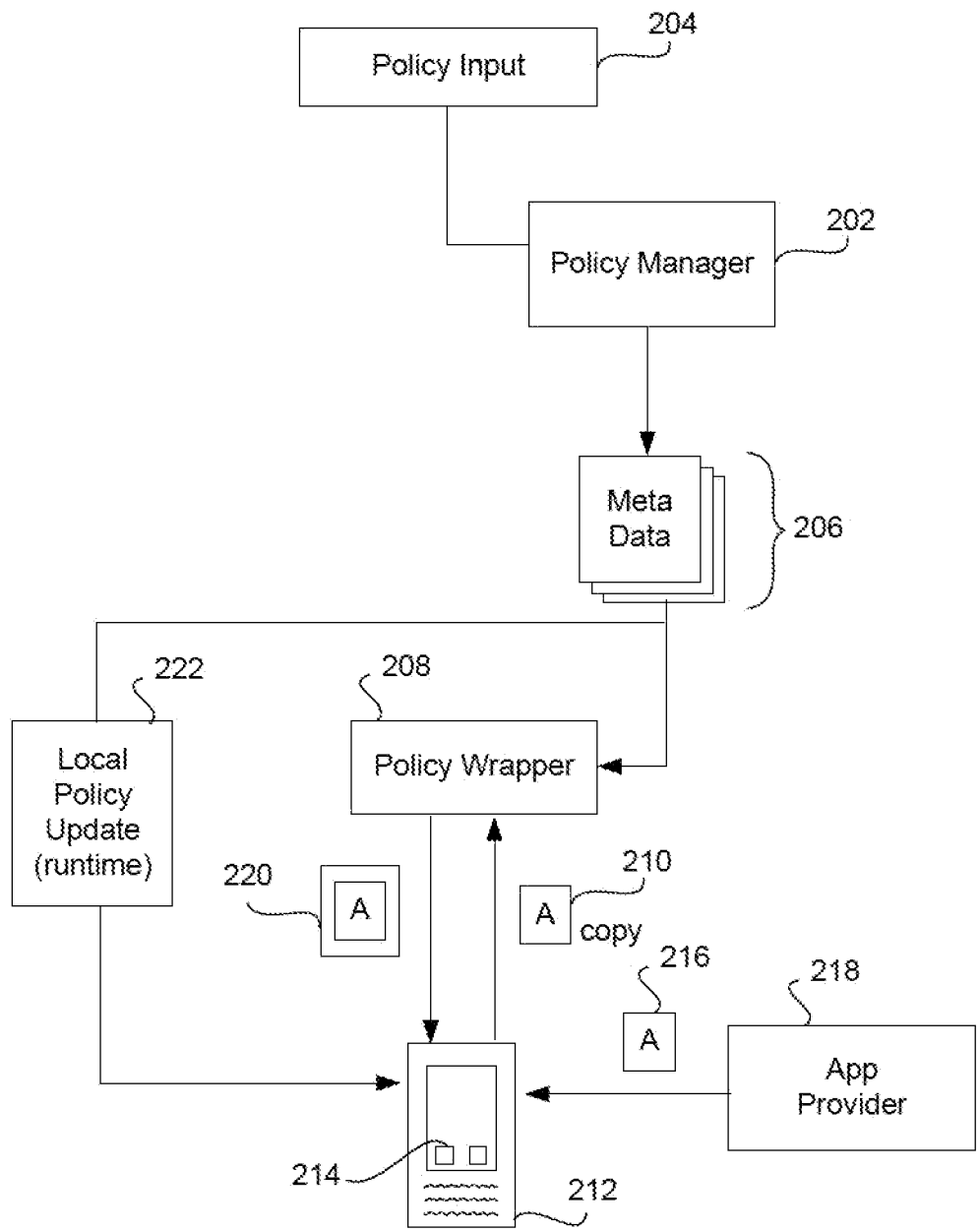
FIG. 2 is a block diagram showing components of an app security program in accordance with one embodiment of the present invention.

FIG. 2 is a block diagram showing components of an app security program in accordance with one embodiment of the present invention. In one embodiment, the security program has two major components, a policy manager and a policy wrapper. A policy manager 202 accepts input from an administrator or other individual who is responsible for setting security for the mobile device. The person may be referred to as the governor since he is governing the security of the one or more mobile devices. The security policy may be set using various user interface screens. There are numerous examples of policies, including geo-fencing (e.g., the app can only be used in a building) and others. The service provider or the entity providing the app security program may also provide default policy and security settings which may be useful for home users. Examples of policy settings are described below. Policy input 204 is inputted into policy manager 202. Policy manager 202 takes the input/settings from the governor and creates policies or meta-data 206. The format or form of meta-data 206 can vary. They essentially reflect the policy settings from the governor.

Metadata (policies) 206 may be used as input to a policy wrapper 208. In one embodiment, this component of the program takes the policies and uses them to secure an app 210 by wrapping it. Wrapper 208 receives an app 210 from a handheld device 212. In one embodiment, wrapper 208 receives a copy of an app 210 instead of the original app 214 that was downloaded onto phone 212 (see FIG. 1B above). Here the handheld device 212 user attempts to download an unsecured app 216 from an app provider 218. In the scenario in described in FIG. 1A, it may operate on the app itself instead of a copy. This may be the case where a market place or app store offers customers a secured version of the app along with an unsecured version (or only offer the secured version). A secured version 220 (security-wrapped version) is returned from policy wrapper 208 to device 212.

Metadata 206 may also be used to update a local policy file (an existing policy that is already on the device). A local policy file is used to update policy parameters residing on device 212. For example, in the case of "geofencing" (i.e., restricting use of an app to an certain physical areas) it is likely that the GPS locations controlled by the governor will change over time. When such a change occurs, the new policies can be applied in two different ways. One is to generate a new policy and apply it to the original app (i.e., wrap the app with the new policy). Another way is to allow dynamic configuration based on a local policy data file with the "variable" part of the policy encrypted/signed inside it. For example, an IT person may want the ability to override a configuration on a device directly through an IT app residing on the device for diagnostic purposes.

In one embodiment policies have two components: a fixed part and a variable part. The fixed part is the content described in the policy file (e.g., "protect the GPS at certain times of day"). The variable part typically is provided by the governor through a console (e.g. "what are the times when the GPS should be protected?"). The variable part can change without applying a new policy.

Policy designers can choose to forego the variable component of the policy and basically "embed" all data or content statically in the policy file. In this case, the console does not have any way to customize the policy.

If the policy designer chooses to include some variable component in the policy, when changes are made to the variable data (on the console), a new data file could be sent to the device to reflect the latest changes. Such a file would be encrypted/signed (to prevent a malicious app circumventing the policy), downloaded to the device, and used by the app security code on the device to apply the new data to the appropriate policy.

Such changes and updates may be done by local policy update component 222 at runtime. This component creates updated policy parameters on device 212. Thereafter, wrapped app 220 will use the updated policy parameters.

In one embodiment, policy manager 202 and policy wrapper 208 are components in the same app security program and may operate on the same computer. In other embodiments, the manager and wrapper components may be on separate computers. For example, the policy manager 202 may be on a server at one site and the policy wrapper 208 may be on a computer at another site and may be managed by a different entity or the same entity. Collectively the manager and wrapper form the app security program which, in one embodiment, is operated by a security service provider. It may also be provided by an enterprise, such as a company, employer, business partner, and the like, or by a mobile phone carrier.

Figure 3:
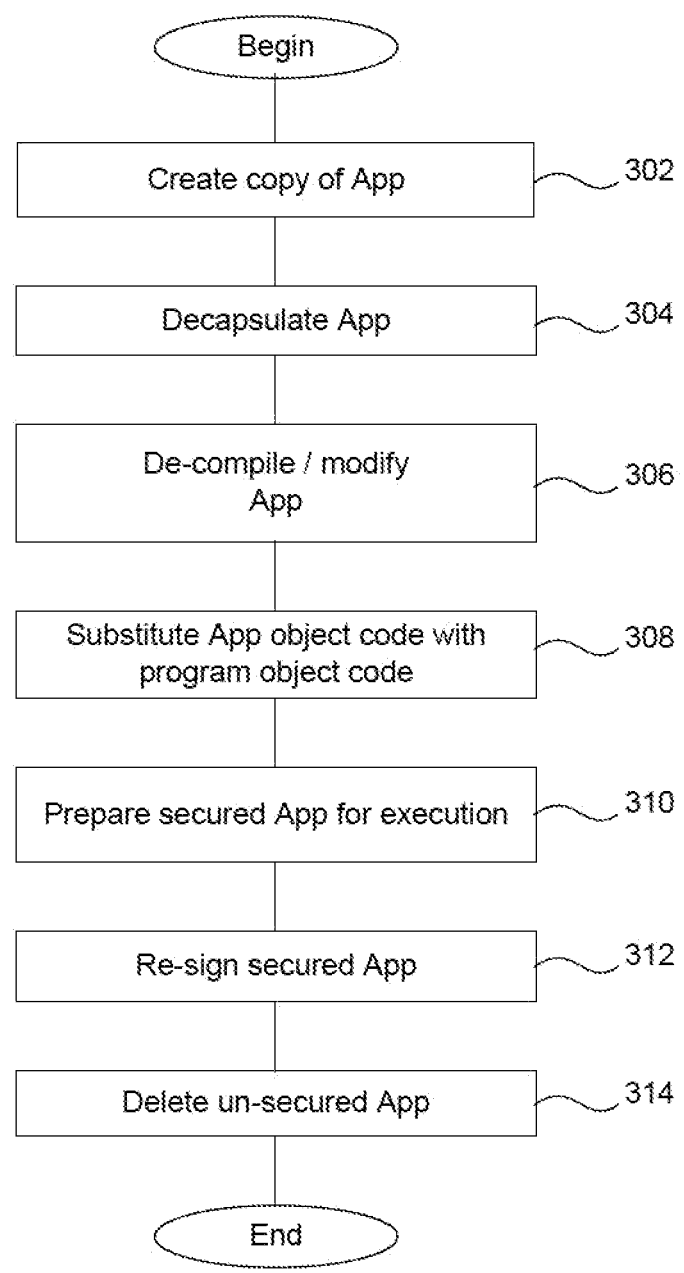
FIG. 3 is a flow diagram showing a process of making an app secure before downloading it on to a device in accordance with one embodiment of the present invention.

FIG. 3 is a flow diagram showing a process of making an app secure before downloading it on to a device in accordance with one embodiment of the present invention. At step 302 a copy or clone of the app that is to be secured is made on the device. In one embodiment, this may be done on the mobile device itself or may be done off the device, for example, on components on the Internet, in the cloud, on an enterprise's server or on a carrier server. The user may be an individual, an employee of a company or other entity. As is known in the field, an app may be obtained in a number of ways, most typically from an app store or an app market, or directly from the app developer or provider or in any suitable manner. By making a copy, the original app is preserved giving the user an option to use either the secured or unsecured version and also protects the user's ability to use the app if something goes wrong with the app control process. Note that in one embodiment, the app is not yet downloaded on to the phone. In one embodiment, the methods described below are performed on separate computing devices. In another embodiment, the process may be performed on a mobile device, but the app is only executed on the device after the process is complete and the app has been made secure.

At step 304 the app is decapsulated. Most, if not all, apps have digital signatures signed by the author/developer. At step 304, as part of the decapsulation, the digital signature is removed from the app. This may be done using techniques known in the art. Decrypting the app may also be performed at this step. These and other steps provide the core object code of the app which may now be operated on by the app control program. The nature and specifics of this operation may depend on the mobile device's operating system.

There are several examples of operating systems for smart phones such as iOS (for the iPhone), Android (used on handsets from various manufacturers), Windows Mobile 7, Web O/S, Palm, and others. At step 306, the core object code app may be either disassembled or decompiled to obtain the executable object code. For example, it can be either "native code" (CPU instructions) or bytecode (virtual machine instructions, such as Java or .Net). In one embodiment, this may be more of a modification process if the device runs iOS where the disassembly is closer to a process of locating and substituting certain links and terms. However, in general, the disassembly process to obtain the object code of an app after it has been decapsulated may be done using techniques known in the art, such as using disassemblers.

At step 308 the app object code is augmented with object code from the app security program. For example, this object code may include class files which are replaced with class files from the security program. The object code generally provides an interface to the mobile device operating system. The app control security program object code is derived, in part, from the policy/meta-data described above. In the case of iOS, the operation is different in that a 'locate and substitute' process occurs rather than an object code replacement. This takes into consideration an interrupt approach that iOS's uses. Generally, the app security program goes through the assembly language code. The specific items located are Software Interrupts (SWIs) within the object code and which are replaced with a branch to an app control security program layer which may then determine what further actions to take, such as making the request, enhancing the results, and others, as described below.

At step 310, after substitution of the object code (or substitutions of SWIs) has been made, the app security program prepares the security wrapped app for execution on the mobile device. The object code substituted into the app by the security program generally provides a bridge or connection between the app and the mobile device operating system. The security program class files may be described as wrapping around the operating system class files. The app security program class files are generated based on the policies created earlier (by input from the governor). The app is essentially re-wired for execution on the handset. It is re-wired to use the app security program layer in addition to the security provided by the mobile device operating system layer. That is, the secured app may still be subject to the security provisions of the operating system. In one embodiment, certain cosmetic changes may also be made to the app, such as changing the icon for the app to reflect that it is secured. By doing this, the user can be sure that when the app icon appears on the handset screen that the secured version of the app will be executed. The app has now essentially been re-factored or re-programmed by the security program.

At step 312 the app is signed with a new key, for example, with the key of the service provider or the key of the enterprise providing the secured app. The re-factored, secured version of the app is returned to the handset device. In another embodiment, the app is wrapped with the security layer on the phone. At step 314, in one embodiment, the original, unsecured copy of the app is deleted from the handset device. This may be done by the secured version of the app once it is downloaded onto the handset. In other embodiments, this is not done and both versions remain on the mobile device. At this stage the process is complete.

Figure 4:
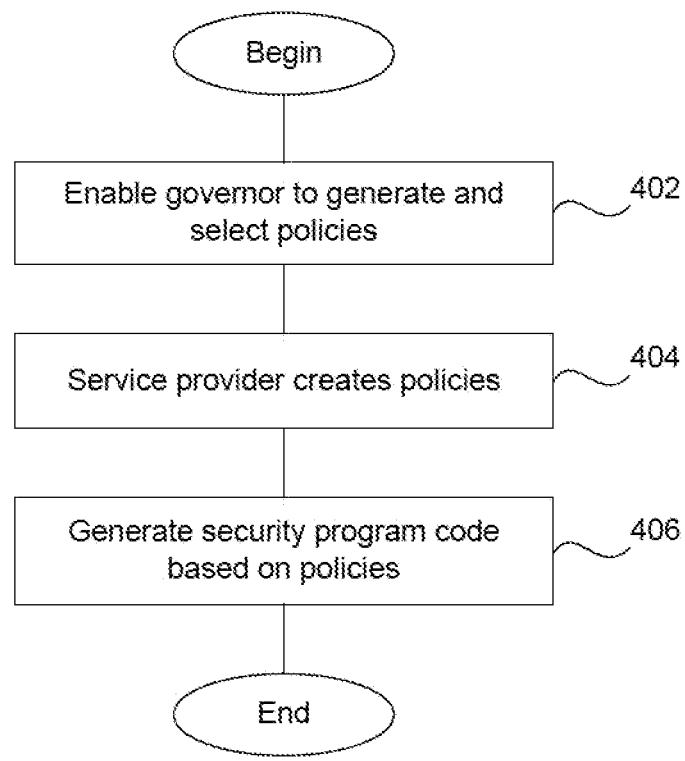
FIG. 4 is a flow diagram of a method performed in policy manager in accordance with one embodiment.

FIG. 4 is a flow diagram of a method performed in policy manager 202 in accordance with one embodiment. At step 402 the governor or other security policy individual is enabled to define, generate, and create security policies. This may be a network administrator for an enterprise deciding a vast array of mobile device security policies for hundreds of employees using dozens of enterprise apps (specifically for work) that may be downloaded on hundreds or thousands of mobile devices. On the other end of the spectrum, it may be a parent who is setting security policy for three or four apps downloaded by her child on a new mobile device. Other examples include preventing or squashing a gaming app using GPS, preventing an app from using a microphone on the device to record or eavesdrop on a conversation, among many others. In either case, the governor may take into consideration the category of the app, the type and nature of app, the author, the age-appropriateness, and numerous other factors. For example, has the same author written any other apps that may have been classified as malware or posed a security threat to the device. It may determine whether there are other apps by the same author. It is at this stage that the governor decides which rules to apply for each app. In one embodiment, this is done off-line by the governor. That is, it may be done using user interfaces on a home computer or on an enterprise network computer used by an administrator where security templates provided by the security program service provider (essentially default templates) may be used or very specific rules may be set using the templates.

At step 404 the security data input at step 402 is used by the app control security program to create the actual policies. At step 406 the app control security program object code is generated based on the input from the governor regarding security policies created at step 404. The governor or service provider may also update existing security policies if needed. As described above, the object code may be used to enhance certain original object code obtained from the disassembled app. The enhancement code is inserted to adjust security and privacy settings for an app in order to protect the enterprise and end user. The original app's behavior is altered which allows the governor to control how the app behaves. For example, if an app stores sensitive account information in the clear (i.e., un-encrypted), the behavior could be changed so that all information the app creates is stored in encrypted form and which can only be accessed by that app given that the key to the stored, persistent data would be unique to the app. In many instances the enhancement code can improve the apps performance since the code is optimized for a particular use scenario.

Figure 5:
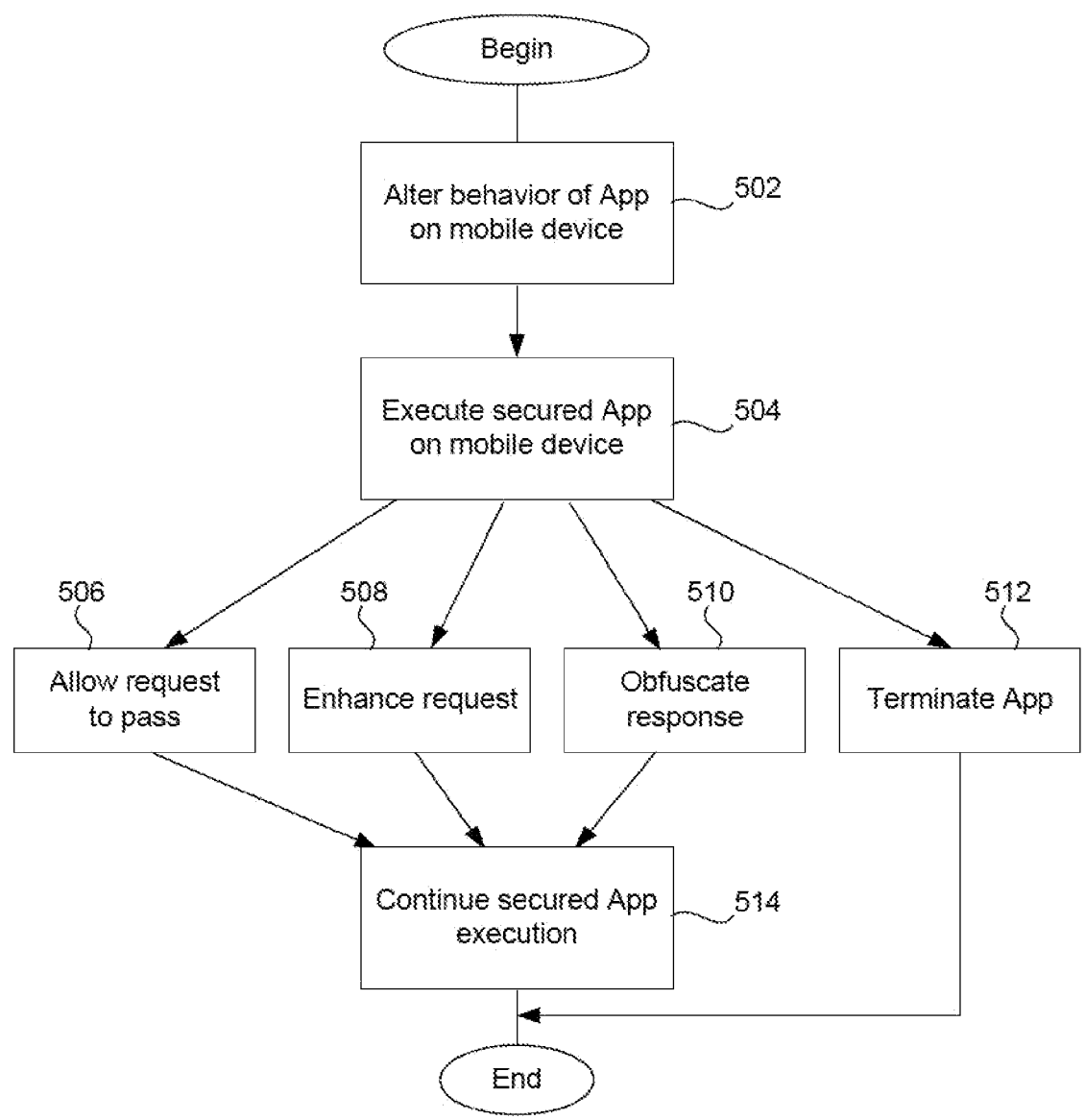
FIG. 5 is a flow diagram showing a process of a security-wrapped app executing on a handset or mobile device in accordance with one embodiment.

FIG. 5 is a flow diagram showing a process of a security-wrapped app executing on a handset or mobile device in accordance with one embodiment. At step 502 the behavior of the app when the app executes or immediately before it executes on the device is altered or modified. For example, behavior modification may include authentication during app initialization; e.g. smart/CAC card, or password challenge. Some apps, as originally designed, may not require a password for security, however, a secured version of an app which has been modified may require that the user enter a password. At step 504 the secured app executes on the mobile device by the user activating it (e.g., tapping on the icon if the device has a touch screen). Upon execution of the app, in one embodiment, control can take one of four options. As is known in the art, when an app executes, it makes calls or requests to the device operating system in order to carry out its functions. In many cases these calls may be harmless or pose no significant security threat to the phone or device. If this is the case, the call may be allowed to pass to the operating system as shown in step 506. Here the call is made to the device operating system and the app executes in a normal manner.

If the security layer or wrapper around the app detects that the app is making a request that may pose a security threat to the device, the app security layer may enhance or modify the request before it is passed to the operating system or other software or hardware component in the phone. This is shown at step 508. In one embodiment, the governor determines which calls are permissible by examining the one or more policies. For example, the governor may determine that all data should be saved in encrypted form. In another example, the governor may decide that only a select group of trusted apps should have data on a soldier's GPS coordinate. In one embodiment, there is no runtime logic to determine what is safe, a potential threat, or an actual threat; it is essentially pre-declared by the governor in the policy created at step 404 above. In another embodiment, there may be some runtime logic. For example, an app may be trying to send out expensive SMS text messages. The app control program may determine this and block the app from sending more than a certain number of text messages, for example, it may limit it to transmission of one message. The enhancement may be adding something new, such as a password requirement. In another example, if the call is to save data on the mobile device memory, the secured app may actually back up the data to a storage area in the cloud or on the Internet (i.e., off the device). In another example, the data related to the call may be encrypted.

At step 510 the secured app may determine that the call is an actual threat and should be dealt with in a more severe manner than at step 508. For example, it may have decided that based on the policy for an app, that if a camera on the device is accessed while in a secure building (e.g., the Pentagon), the app should immediately be terminated. Merely enhancing the request may not be sufficient in this case. At step 510, the request may not be allowed to proceed to the operating system or any other component of the device. However, in one embodiment, a response is returned to the app, but that response is intentionally not accurate or correct. It is essentially an obfuscated response. For example, it may be a GPS coordinate that is not the actual physical coordinate of the device (e.g., the device is in California, but the GPS coordinate that is returned to the app is a coordinate in Nebraska). This may be desirable when apps are used by children. Other examples may be returning bad or garbled data results if an app that should only run within a restrictive environment (e.g., a secure office area) is determined to be running outside that environment (e.g., at home). In this example, the app may be partially crippled so that the app can only access unclassified data and wherein classified information is nullified. In another example, when a user is attempting to paste or copy sensitive data from a classified app to a non-classified app, the app control program may change the copy of the data that is being pasted to garbage or essentially make it meaningless. After either steps 506, 508, or 510 have completed, the security-wrapped app continues execution on the mobile device at step 514.

At step 512 the security layer around the app has determined that the call being made by the app or that the app execution behavior in general poses too high a security threat level to the mobile device. In this extreme case, the security layer decides to terminate execution of the app and/or delete the app. For example, the app may be using too many resources on the phone, such as bandwidth, or is making too many high-risk calls to the operating system thereby overexposing the mobile device. In this case, the app can simply be deleted from the phone or the app may be terminated. The user may not be able to re-execute it or re-install it. For example, an employee may not install that app again on the company phone because it was exposing sensitive company data. Or it may be determined that an app is secretly collecting data on the phone or installing malware.

Figure 6:
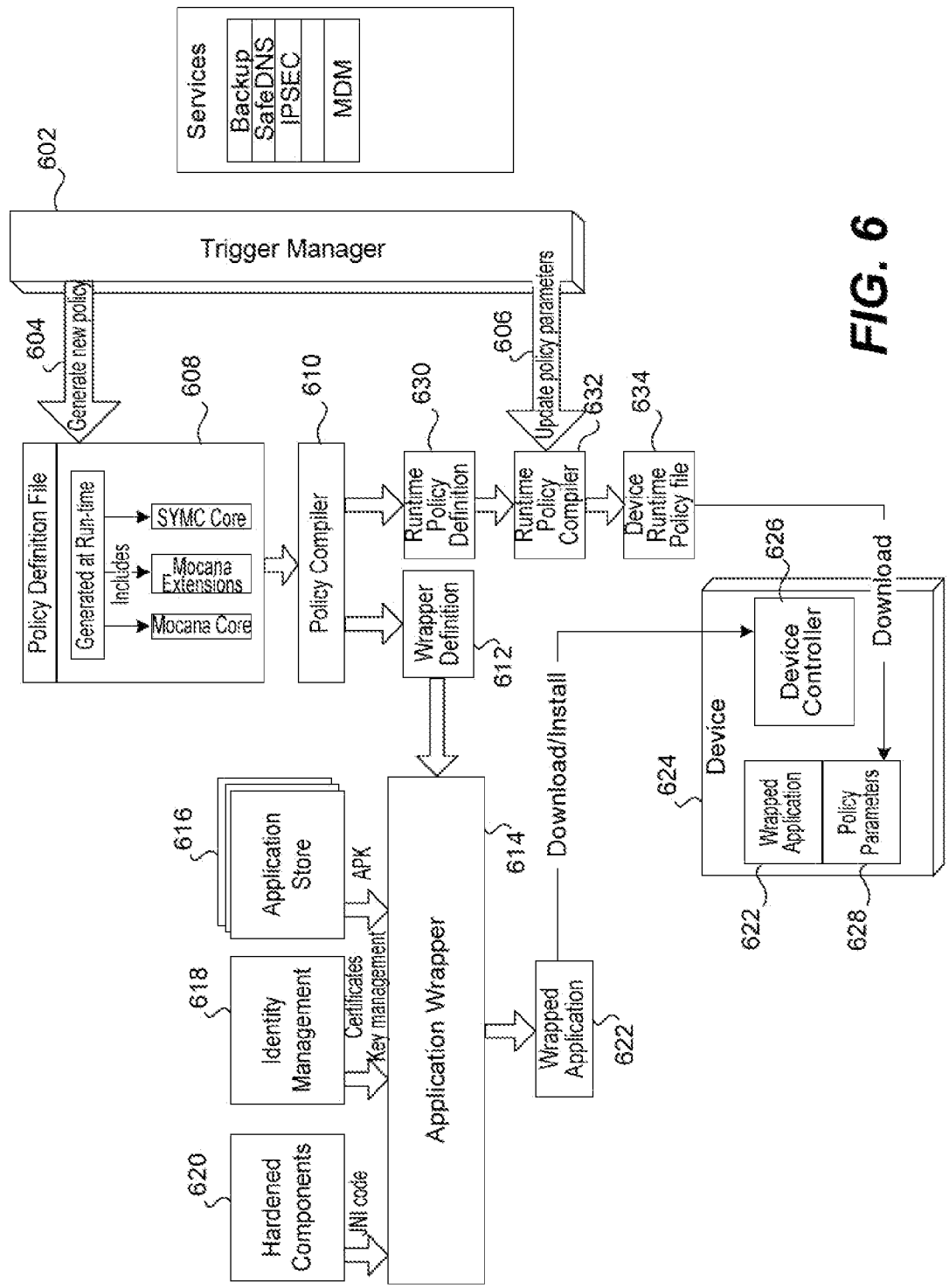
FIG. 6 is a system architecture diagram of the app security control system in accordance with one embodiment.

FIG. 6 is a system architecture diagram of the app security control system in accordance with one embodiment. A trigger manager component 602 handles two events, one for generating a new policy 604 and another for updating policy parameters 606. Such events can be triggered by various systems. For example, a console administrator or governor might apply a new policy to all devices (a manual operation). Or a network monitoring application, after detecting suspicious traffic originating from a device (or app), could push a new policy that would prevent a user/device/app from accessing network resources (an example of an automated operation). The various systems or entities that have the authority to change/update polices, do so through the trigger manager 602.

New policy output 604 is input to a policy definition file 608 which may be generated at runtime and may include various types of code and extensions, for example, specific to the app control service provider, or to the app/user/device the policy applies to. Policy definition file 608 is input to a policy compiler 610 which has two outputs. One output is a wrapper definition file 612. This file is input to an app wrapper component 614. App wrapper component 614 is responsible for generating secure app by injecting custom binary code (native or bytecode) into an app, downloaded directly, for example, from an app store. Or the app could be an app the user downloaded on to his device, and then uploaded to an "App-Control" server.

App wrapper component 614 may have three inputs: apps from one or more app stores 616, certificate key management data from identity management component 618, and hardened components 620. Key management data is used to tie the identities of the user, device, and the app, and ensure that any operation subject to policy control can be tied to a specific user/device/app. This also ensures that a wrapped application can only be run on a specific device to prevent a malicious app from circumventing policies and hardened components 620 (for example "Device security framework"). The output from app wrapper 614 is a wrapped app 622 which is downloaded or installed onto mobile device 624 via the device's controller 626. Device controller 626 responsibilities include: download app from the app wrapper; ensure that app running on the devices are appropriately wrapped apps (e.g., app wrapped for user1 should not be installed/run on device for user2); report list/version of installed applications to allow the management console to control policies for each device/user/application; and download policy parameters when appropriate. Wrapped app 622 resides on device 624 coupled with policy parameters 628.

Returning now to policy compiler 610, the other output is a runtime policy definition file 630. This file is input to a runtime policy compiler 632 which also accepts as input policy parameters 606 (specified by the management console, or other subsystems). Output from compiler 632 is a device runtime policy file 634. This file 634 is downloaded onto device 624 as shown as policy parameters 628, and is used to customize the policies applied to wrapped app 622.

Described below are various use cases and capabilities of the app control security program of the present invention. One use case involves the separation of work life and personal life on a mobile phone. There are apps for the user's personal use and apps that the user's employer (or a business partner of the employer) may have provided and the apps operate on the same phone, which is often the user's personal phone. The governor who determines security of the apps that need to be secured on the user's phone may block copy/paste operations between apps (such as e-mail apps). The governor may set policies for the work-related apps that perform selective wipes of apps and associated files. User location-based policies may also control where certain apps may execute. Examples of levels of protection because of malware are denying access to contacts, denying transmission of SMS without consent, and the like.

Another example of a use case is app control. Using the present invention, white and black listing of apps may be implemented, as well as full deletion of apps according to the policies set by a governor. An app may be 'sandboxed' to protect the other apps, software, and hardware of the device. Other capabilities may include identity-based control of apps or services and highly granular control over app behavior. Trojan identification is another use case that can be implemented with the app security program. For example, each app and content may be encrypted to prevent rogue apps from gaining access to and stealing confidential data on the phone. The security program may also be able to identify anomalous system call behavior of an app to identify malicious Trojan apps that act outside of their published intent.

Another use case is back-up and recovery of app data in which IT security administrators and governors have data revision control and can implement app and device content migration through back-up and restore operations. In another use case is network traffic monitoring. The app on the mobile device may be brought under the visibility of existing enterprise IDS/IPS/Web filtering infrastructure to allow for inspection and control of app communications. The app security program can also integrate with third-party DNS services, such as Symantec's DNS service to identify malware. All app communications may be encrypted, including communications at the mobile phone service provider. Other use cases include session continuity, consumer privacy (e.g., GPS obfuscation, implementing safe DNSs), and intercepting payment/transaction messages from the mobile device (i.e., operating in the middle of mobile commerce streams).

In one embodiment, the app security service is offered by a third-party service provider, for example, to make apps used by end-users or individuals (i.e., users not associated with an employer or enterprise). For example, a parent may want to obfuscate the GPS of a child's phone because the parent does not want a social network site, such as Facebook, to know where the child is, essentially disabling GPS. In another embodiment, an app store, operated by a wireless phone carrier (e.g., Verizon, AT&T) may offer a secured app for an extra charge or premium. A customer of the carrier can download the secured app from the marketplace or online store instead of the unsecured version by paying an extra amount. In another embodiment, an enterprise may have its own app store for its employees, partners, and the like, where users can only download secured versions of the apps (which may be referred to as "hard" apps). These apps may have many of the security features described above as defined by a governor (security administrator) at the enterprise, such as blocking copying and pasting e-mail or corporate data, killing an app from the user's phone if the user leaves the company, and so on. A mobile phone carrier's DNS can typically access any site, but the app security program can block a mobile device browser so that it can access only a safe DNS (e.g., Symantec's DNS) from where only safe Web sites may be accessed. In another embodiment, the app security program provider can work with the mobile device manufacturer to incorporate the app security program or functionality into the hardware and software operations of the device. In this embodiment, described below, a user can download an unsecured app and make is secured on the phone or device itself before executing and does not have to access a third-party service to have the app secured or ensure that the app is secured before being downloaded onto the device.

As can be seen from various embodiments described above, the security of the mobile device extends beyond the device itself and is applied directly to the apps that are downloaded onto the device. Companies and other entities are able to take advantage of apps more freely without having to worry about the security risks, such as data leakage or malware infection of the company's enterprise IT system. Companies can maintain governance of its corporate data.

In another aspect of the present invention, a VPN is created and utilized by individual apps on a device. That is, an app has a VPN tunnel to communicate with, for example, a corporate VPN gateway. This VPN tunnel is used only between the single app on the device and the VPN gateway. In one embodiment, each security wrapped app has its own IP stack or, more generally, VPN stack. Methods and systems for creating a VPN tunnel for a specific wrapped app on a device are described in FIGS. 7 and 8.

As noted above, conventionally, a VPN tunnel is built (on the client/device side) on top of the system UDP or TCP modules, which in turn communicate with the VPN gateway.

In the described embodiment, the device may be a smartphone, tablet, or other mobile device. In other embodiments, the device may be a PC or a laptop. It may also be a wearable device, such as a watch, goggles, or other nomadic Internet-enabled computing device. In yet other embodiments, the device may be any Internet-enabled appliance or system. Examples include cars that have Internet access, household appliances (refrigerators, washers, etc.), or HVAC, home heating/AC systems, or security systems. As noted, the described embodiment uses mobile devices where users download apps. However, the present invention may also be used in other embodiments and contexts.

Generally, there is software on the device, such as a smartphone, tablet, PC, or other Internet-enabled device, that allows it to make a VPN connection to a gateway device. However, the described embodiment provides a more compartmentalized way of creating and utilizing a VPN tunnel on the device that is more secure. In one embodiment, each wrapped app has its own VPN tunnel. In another embodiment, some or all apps in a federation of apps on a device have the option of sharing one VPN tunnel. A secure form of IPC may be used to communicate between the processes in the case of a "federated" application. As described in more detail below, IPSec packets may be built for each wrapped app (each wrapped app operating in its own sandbox, that is, outside the device operating system). The IP packets are transmitted via a proxy or virtual data link layer (part of the app VPN stack) to a native UDP module in the operating system. From there it is transmitted to a VPN gateway. As noted above, the device may also be a PC. For example, a PC running a wrapped version of Microsoft Outlook may have its own VPN tunnel from the PC to the gateway In order to establish a VPN tunnel, an initial step is to create only packet types that a typical operating system makes available to applications. For example, to connect to an IP-based VPN, an application can use TCP or UDP packets. In the described embodiment, the app IP stack uses UDP packets. Generally, it should not use "raw" IP packets (without a specific Layer 4 protocol), because such packets are typically reserved by operating systems so that only privileged applications may send or receive them. A per-app VPN, as described in various embodiments of the present invention, is not required to be a privileged process on the device. NAT traversal of IPsec packets is enabled using UDP protocol (as described in RFC 3947 and RFC 3984), rather than raw IP packets.

In order for an app to send data through a VPN tunnel to a gateway, the app must be able to build IP packets which are then encapsulated using VPN software on the device. The IP packets are built using an IP stack. This software typically resides in the operating system of the device. Therefore, in order for a per-app VPN to operate, in one embodiment, the app makes use of an IP or VPN stack that is used to build a tunnel that is only used between the single application and the gateway. That is, in one embodiment, it is not used by other apps. This stack may also be referred to as a per-app IP stack, in the app sandbox. The goal being to generally replicate operating system functionality in the sandbox.

Figure 7:
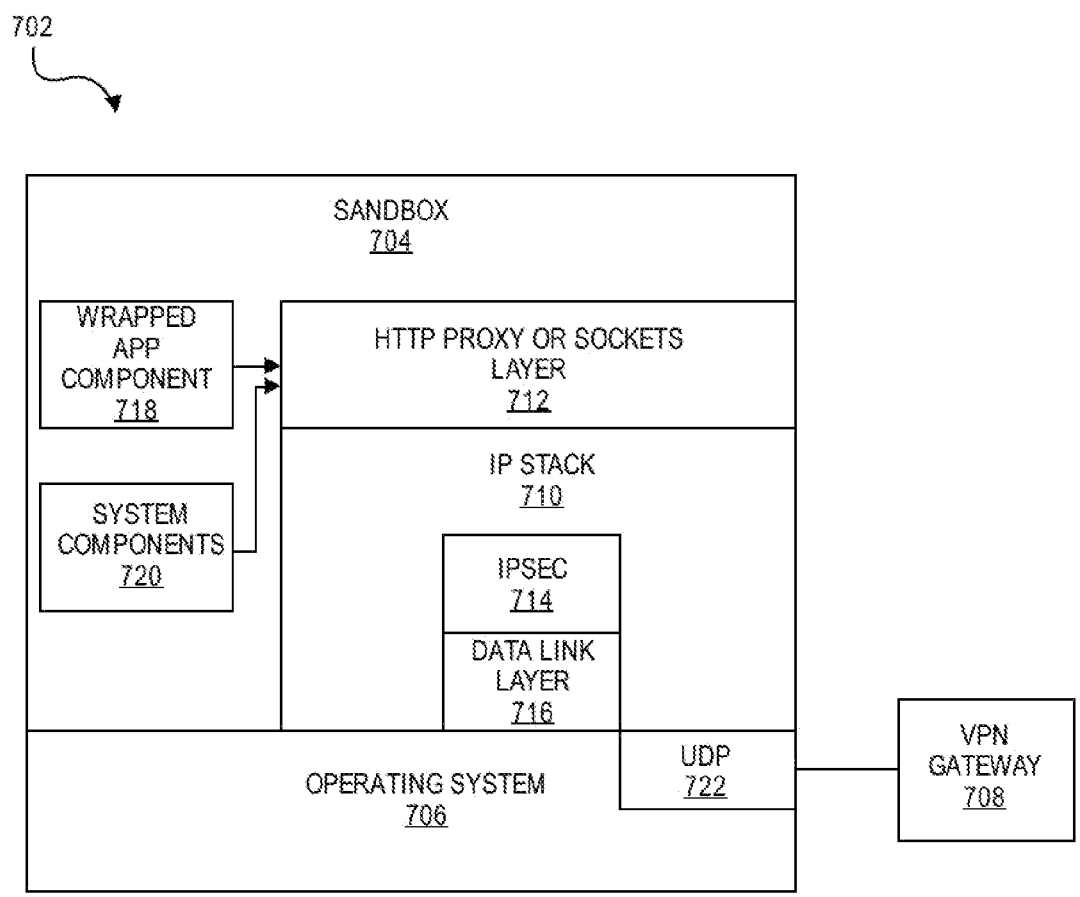
FIG. 7 is a block diagram showing components and modules in a mobile device needed for implementing a per-app VPN in accordance with one embodiment.

In order for any IP stack to access an outside network, it uses software referred to as data link interface (also known as Layer 2, per the TCP/IP and OSI networking models). In one embodiment of the present invention, and as shown in FIG. 7, this data link interface is implemented as a proxy (or virtual) data link interface to an underlying operating system's (native) IP stack. In one embodiment, given that only UDP packets are sent and received, this proxy data link interface supports sending and receiving UDP traffic via the native operating system's IP/VPN stack and the per-app IP/VPN stack. An IPsec module decrypts the inbound traffic coming from the virtual data-link layer, and encrypts the outbound traffic from the per-app IP stack.

IPsec is typically implemented as a "bump in the [IP] stack", and is integrated into an operating system's IP stack. In one embodiment, IPsec is implemented in the per-app IP stack instead. As noted, a proxy or virtual data link interface for IPsec is defined in the per-app IP stack. The IPsec encapsulates traffic (IP packets) built through the per-app IP stack and routes the traffic via the proxy data link interface, in one embodiment, to a UDP module in the native operating system space.

FIG. 7 is a block diagram showing components and modules in a mobile device needed for implementing a per-app VPN in accordance with one embodiment. Shown are the two relevant memory spaces on a mobile device 702: a sandbox area 704 containing components of a wrapped app, system components, and an IP/VPN stack, and a device operating system space 706. Also shown, external to mobile device 702, is a VPN gateway component 708. As noted above, embodiments of the present invention involve creating and implementing an IP stack for a security wrapped app in sandbox area 704.

An IP stack 710 has some of the conventional layers of a TCP/IP stack, such as network layer and transport layer. Above IP stack 710 is an HTTP proxy or sockets layer 712. Two components in app IP stack 710 are IPsec 714 and proxy data link layer 716. Virtual data link layer 716 functions as an IP interface to between virtual IPsec 714 and native UDP module 722. The combination of virtual IPsec 714, virtual data link layer 716, and IP stack 710 may also be referred to as a "per-app VPN" stack. The primary goal of the per-app VPN stack of the present invention is to replicate operations and functionality that take place in native operating system 706. Components for a single app and any system components reside in sandbox area 704. However, for illustration, only one app component 718 and one system component 720 are shown.

Native operating system 706 contains several components, including a system-level or native IP stack (not shown). One of the modules in operating system space 706 needed for the present invention is a UDP module 722. As noted, IPsec packets are transmitted from mobile device 702 to VPN gateway 708 using UDP. In other embodiments, TCP may be used. Data packets for the security wrapped app are also received from VPN gateway device 708 at UDP module 722 and relayed to proxy data link layer 716.

Figure 8:
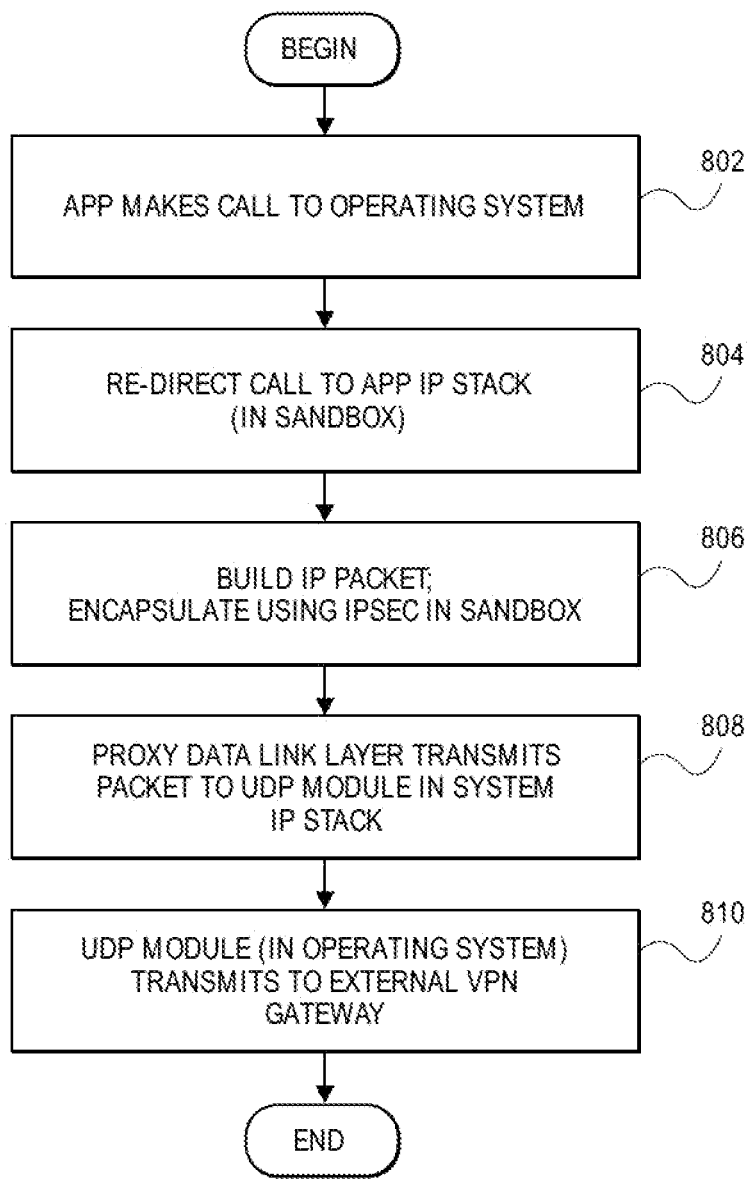
FIG. 8 is a flow diagram of a process of implementing an app VPN in accordance with one embodiment of the present invention.

FIG. 8 is a flow diagram of a process of implementing an app VPN in accordance with one embodiment of the present invention. A security-wrapped app in sandbox 704 executes in a normal manner and in the process makes calls to the device operating system, some of which require communication over a VPN. This occurs at step 802. In one embodiment, those calls are re-directed to app IP stack 710 at step 804. In one embodiment, The interfaces that are exposed to the application (and app and system components, boxes 718 and 720) through HTTP proxy layer box 712 mirror the corresponding interfaces provided by operating system 706.

At step 806 the app IP stack builds IPsec packets in a conventional manner. This would normally be done by the system/native IP stack as a result of an app or system component in the sandbox making a call to the operating system. IP packets are then encapsulated using IPsec in the app VPN stack. At step 808 a proxy data link layer, also part of the app VPN stack, transmits packets to a UDP module in the system/native IP stack. In other embodiments, where an SSL VPN is implemented, the packets may be transmitted to a TCP module. As noted, the proxy (virtual) data link layer functions as an interface between the app IP stack and the system native stack, specifically the UDP module. The IPsec module can be described as a virtual IPsec interface. This interface together with the virtual data link interface functions to get IP packets down through the app VPN stack and out through the native UDP module to the VPN gateway.

It may be noted that this is possible by virtue of using network address translation (NAT). As is known in the art, this technique allows an entity to allocate "private" IP addresses which are mapped to public IP addresses. The private IP addresses are never seen by the public. Traditional NAT approaches are able to rewrite an IP packet and then send it to a different, private address.

As noted above, by configuring a particular application with its own VPN tunnel, one could configure the app security wrapping server to restrict access to network resources so that the app can only access the specific resources it needs. If HTTP proxy 712 is listening on a TCP port provided by operating system 706, other applications could potentially connect to that TCP port. In one embodiment, HTTP proxy layer 712 implements techniques to prevent other applications on the device from accessing the HTTP proxy. In one embodiment, the system determines if a connection to the HTTP proxy layer 712 came from the current process (i.e., the wrapped, host app), for example by looking through all the file descriptors in the current process and checking with the kernel to determine if any of file descriptors made the connection to HTTP proxy layer 712. If the authenticity of a group or federation of apps can be validated and establish communication between those apps, in one embodiment, the federated apps can share a single VPN tunnel. Although this would lower the number of concurrent VPN tunnels needed for a device, it may detract from some of the advantages described above, such as configuring a server to restrict access to network resources such that the app can only access the specific resources it needs.

As such, in one embodiment, only the specific security wrapped app can connect to the VPN tunnel that is created by that app's VPN stack. This prevents another malicious app or any other malware on the device from stating that the HTTP proxy for another app is also the proxy for the malicious app, thereby preventing the malicious app from using the wrapped app's VPN. In another embodiment, a VPN tunnel created by a security wrapped app may be shared by other wrapped apps in the same federation or group as the app that created the VPN.

In another embodiment, a device user may need a VPN to gain any type of access or connectivity at all (e.g., if the user is working abroad in a country with restrictive Internet access), the user can access a device-level VPN to gain initial full-internet access, and then use a per-app VPN to gain corporate access.

Another advantage of tying a single application to a VPN tunnel is the ability to restrict, at the VPN gateway, the network resources that the application has access to, by using a different "configuration profile" (i.e., VPN group) per application.

In another aspect of the present invention, the service provider offering app security services implements mechanisms through app wrapping to ensure that a TLS connection or other type of network connection between a wrapped app and a remote server (e.g., a company web server or a VPN gateway) is indeed secure and being made by a known entity before the connection is established and used to transmit actual app data (e.g., sensitive employer data, user financial data, session tokens). As is known in the art, prior to transmission of actual data used by the app, a negotiating phase occurs (over the same channel of communication), whereby the TLS protocol allows the app and the remote server to agree on security parameters. This negotiation phase is relevant to various embodiments of the present invention.

In one embodiment, the app uses TLS for establishing network communications and connections. In general, the overall process involves components in the layer that wraps the app, wherein the components are for intercepting network communications to and from the app to determine whether the app is attempting to make a remote connection and, if it is, snooping or inspecting the TLS handshake traffic, and deriving or discovering an certificate, and determining whether the certificate is trustworthy and from a known entity. If the certificate, in one embodiment an X.509 certificate, cannot be trusted, the TLS connection is denied by the app wrapping layer, as described in more detail below. In addition, if an app is not using TLS at all, its connection attempts can be denied before application data is transmitted or received.

Figure 9:
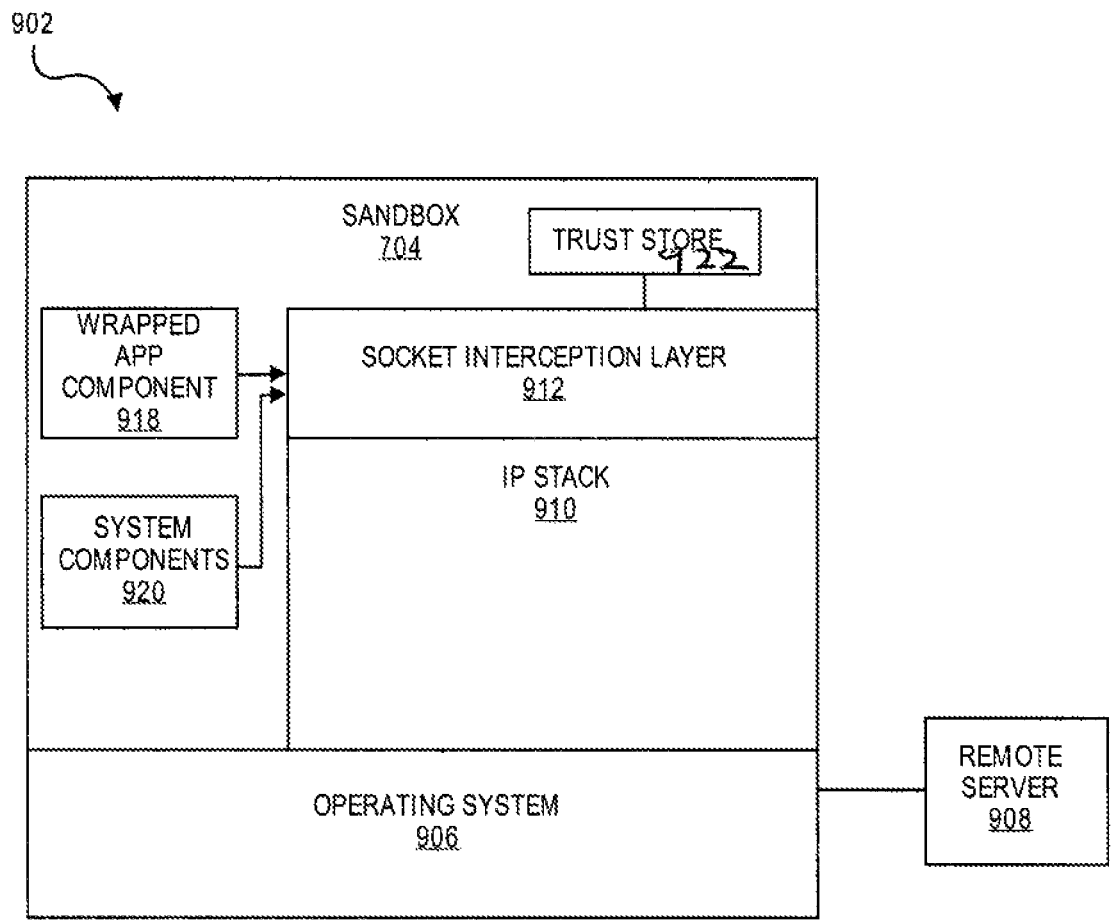
FIG. 9 is a block diagram showing components relevant to ensuring TLS security between an app and a remote server.

FIG. 9 is a block diagram showing components relevant to ensuring TLS security between an app and a remote server. As described above, an app is wrapped on a mobile device using methods described in various embodiments shown in FIGS. 1 to 6. A VPN tunnel may be established between a specific app (or a federation of apps) and a VPN gateway server (one type of remote server) as described in FIGS. 7 and 8. In one embodiment, a TLS connection can use the VPN tunnel described above or it may not.

Some of the components in FIG. 9 are also described in FIG. 7. Shown are the two memory spaces on a mobile device 902. One is a sandbox area 904 containing wrapped app components 918, system components 920, and an IP stack 710, all necessary for app execution but not directly relevant to embodiments of the present invention. The other memory space 906 stores a device operating system which includes all the conventional modules and components of a mobile device operating system, including a sockets layer which normally receives traffic to and from apps executing in memory space or sandbox 704. Also shown, external to mobile device 902, is a remote server 908. As noted above, embodiments of the present invention involve ensuring that a TLS or other connection between wrapped app 918 and server 908 is in fact secure before it is used for transmitting actual app data.

On top of IP stack 910 (specifically for the wrapped app) there is a sockets interception layer 912. This layer 912 intercepts certain function calls, including reads, writes, and information about the type and destination of each opened socket, from the app. Reads and writes from the wrapped app would normally go to a sockets layer in operating system 906 of the mobile device but instead are re-directed to the sockets interception layer 912. However, in various embodiments of the present invention, these calls go to sockets interception layer 912 of the wrapped app IP stack 910 which has the conventional layers of a TCP/IP stack, such as network layer and transport layer. Another component in memory area (sandbox) 904 is a trust store 922. This component, as well as sockets interception layer 912, are inserted or injected into the app when the app is security wrapped. Trust store 922 contains trusted certificates from certificate authorities known to the security service provider. Its use is described below in FIG. 10. As noted, components for a single wrapped app and any system components reside in sandbox area 904. However, for illustration, only one wrapped app component 918 and one system component 920 are shown.

Native operating system 906 contains several components, including a sockets layer (not shown) which normally receives calls from an app. However, in various embodiments of the present invention, once an app is wrapped, reads, writes, and other data traffic from the app do not go to the operating system sockets layer. They are intercepted by sockets interception layer 912.

Figure 10:
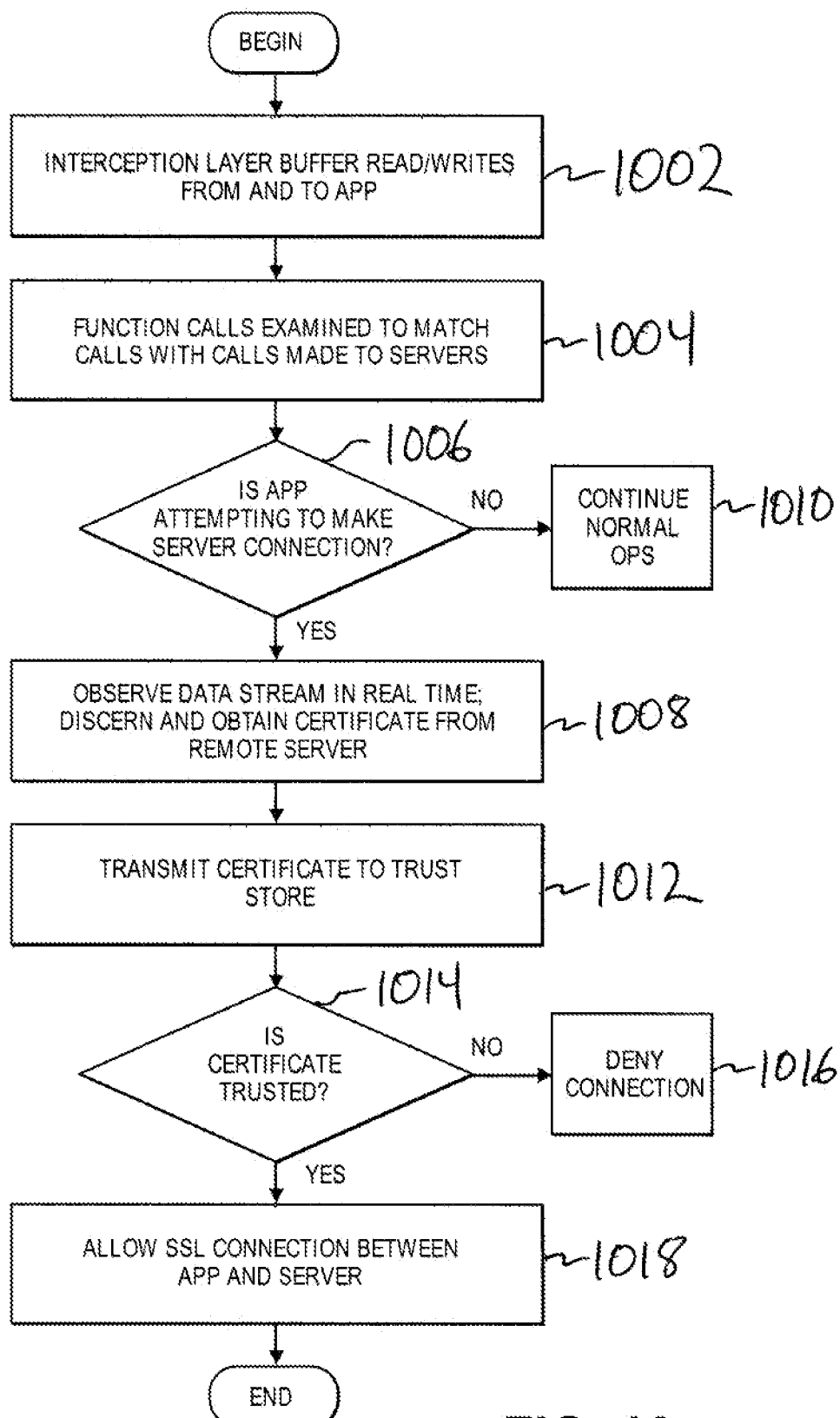
FIG. 10 is a flow diagram of a process of determining whether a TLS connection can be trusted and is from a known entity at the time it is being established between a mobile device and a remote server in accordance with one embodiment.

FIG. 10 is a flow diagram of a process of determining whether a TLS connection can be trusted and is from a known entity at the time it is being established between a mobile device and a remote server in accordance with one embodiment. The process begins at any time during app execution. An app can attempt to open as many TLS connections as it needs at any time during its execution, including when it is initially invoked. The connection is with a remote server, such as a corporate/employer web server (e.g., to exchange business data with the app), a VPN gateway, or any other type of server that the app needs to connect to. Of course, an app can execute and not attempt to open a TLS connection or any other type of connection with a remote server. The process described in FIG. 10 is performed regardless of whether the app attempts to open a TLS connection. That is, components of the wrapped app do not know a priori that the wrapped app will open a connection.

At step 1002, the sockets interception layer on top of the IP stack for the wrapped app receives or intercepts reads and writes to and from the wrapped app and other function calls. This traffic to and from the wrapped app (not the device in general) is re-directed and buffered by the sockets interception layer when the app is invoked or opened by a user. The sockets interception layer buffers all relevant reads and writes in sandbox 904. Relevance may be determined by whether a socket has been opened for communication with the Internet and if it is a stream-based socket. In one embodiment, determining why a socket has been opened may be done by checking if it is within a certain allowed range of hosts on the Internet. In one embodiment, non-stream based sockets, such as UDP, can be immediately closed. In another embodiment, UDP sockets' data transfer can be examined to ensure that they are properly secured with DTLS, a derivation of SSL which has the same security services but uses UDP for its transport protocol.

Once a socket has been opened and its type has been determined, a unique identifier (often called a file descriptor) can be used to correlate future reads and writes against a particular network (socket) connection. These reads and writes are subsequently buffered by the interception layer, until the connection is determined to be secure and allowed to remain open, or the connection is determined to not be secure, and the connection is dropped. This is done at step 1004. That is, the sockets interception layer associates buffered read/write data with network server connections by examining the messages sent by the TLS protocol. In particular, the certificate sent by the remote server to the application (which would normally be verified by the application) is subjected to additional verification against the trust store, previously injected into the app.

At step 1006 the interception layer determines whether the app is attempting to make a server connection. If it is determined that the app is attempting to make a connection, such as a TLS connection, to a network server, control goes to step 1008. If no network connection attempt is detected from examining the buffered data, the app continues with normal operations at step 1010.

At step 1008 socket interception layer observes the data stream between the app and the remote server. That is, it looks at the traffic which it now knows is between the wrapped app and a remote server and is for the purpose of establishing an TLS connection or another type of network connection. The wrapped app (not the device) and the remote server are in the TLS negotiation phase. At this stage the interception layer is snooping on the SSL handshake or negotiation phase data between the app and the remote server. In one embodiment, the purpose of this snooping is to discern and eventually piece together what is referred to in the field as an X.509 certificate, the certificate sent from the remote server in order to establish the connection.

Conventionally, an app running on a mobile device does not attempt to validate, in any manner, an X.509 certificate but allows a trusted framework on the device to do it on its behalf. This is because an app normally does not attempt to make a TLS connection on its own. It generally would have the device operating system perform this function. However, even the device operating system would not try to discern or discover an X.509 certificate from the remote server. The socket interception layer examines the data traffic from the negotiation phase/handshake and from this traffic is able to identify the certificate sent by the remote server. In particular, the interception layer observes the TLS protocol handshake until it sees a 'ServerHello' message. The socket interception layer then expects that the TLS protocol will then send a 'Server Certificate' message containing the X.509 certificate.

In another embodiment, the interception layer may not receive or need a Server Certificate message if one was previously sent. If the layer has kept a session ID from a prior connection and if the security service provider or app knows what this session ID should be, the ID can be used for rapid re-handshaking or session resumption, primarily because the connection is being made without the need for re-sending the X.509 certificate.

If the certificate cannot be discovered or discerned from snooping the TLS handshake traffic, the TLS connection between the wrapped app and the remote server is not allowed. At step 1012 the interception layer transmits the remote server certificate to the wrapped app trust store (or certificate store) containing one or more certificates from certificate authorities that the service provider trusts. At step 1014, the certificate is compared to each of the trust store certificates to see if there is a match between the issuer of the TLS certificate and any of the CA's in the trust store. In this manner, it is determined whether the TLS certificate from the remote server can be trusted. If it can, control goes to step 1018. If not, the connection is denied at step 1016 and an appropriate message is sent to the user and others, such an IT or network administrator at the user's company. If the certificate is trusted, a TLS connection is established between the wrapped app and the remote server and app operations continue normally.

The data is inspected to make sure that it meets certain criteria before it is allowed on a network and received by the app. In this respect, the present invention may be characterized as implementing a firewall for a wrapped app, rather than for more conventional entities such as a device, network, or operating system. As described above, the "per-app firewall" of the present invention either accepts or rejects connections to the wrapped app itself. For example, the service provider inspects a TLS handshake to ensure that it matches certain criteria so that the app connects to a known entity and not a hostile or unauthorized party.

As described in FIG. 10, the reads, writes, and other functions calls, and data traffic are intercepted, buffered, and inspected in real time, that is, while the app is running on the device. Thus, any TLS connections attempted by the wrapped app are examined for security and trustworthiness (i.e., the connection is being made with a known entity) while the user is using the app and without any noticeable difference in app execution, performance, or behavior. Each TLS connection that is made is inspected in real time. In other embodiments, criteria other than examining a certificate chain may be used for determining security of the connection, such as examining a DNS name, an IP address, or the protocol being used.

In one embodiment, the DNS traffic is intercepted and examined (and possibly changed) to ensure that the connection is secure. In this manner, DNS traffic may be protected. For example, a DNS entry may be hard-coded into an app to prevent a "man-in-the-middle" attack against the DNS infrastructure, or DNS replies may be checked to ensure that they fall into a particular IP address range. This and the other protective measures described above are being done at the app level or layer, not at the device (physical), operating system, or network layers. The embodiments described may also be used with a non-SSL client. In another embodiment, a DNS "whitelist" may be implemented, thereby having a DNS geo-fencing effect. An app may use built-in DNS instead of device-wide DNS, so all app DNS queries go to a known, trusted (and intended) enterprise. In one embodiment, UDP communications from an app would be disabled to prevent data leakage, except for communications to the service provider's DNS.

Figure 11A:
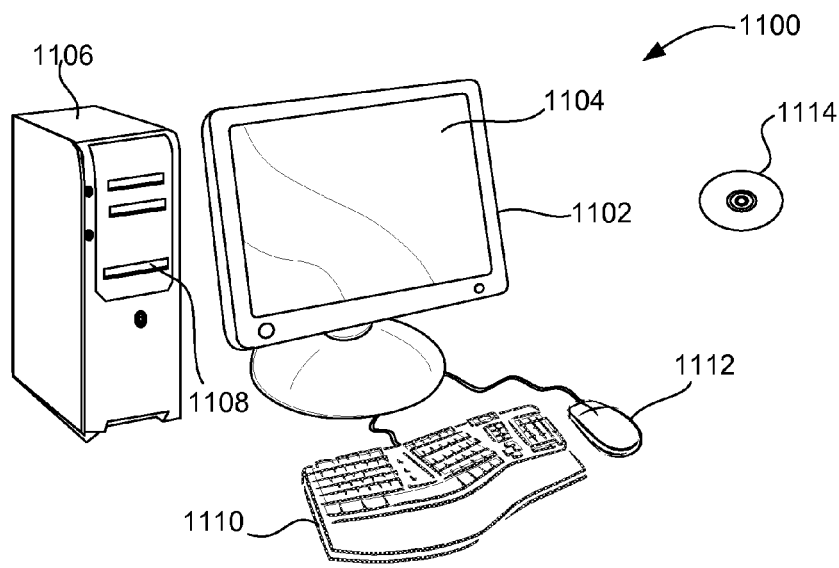
FIGS. 11A and 11B are block diagrams of a computing system suitable for implementing various embodiments of the present invention.
Figure 11B:
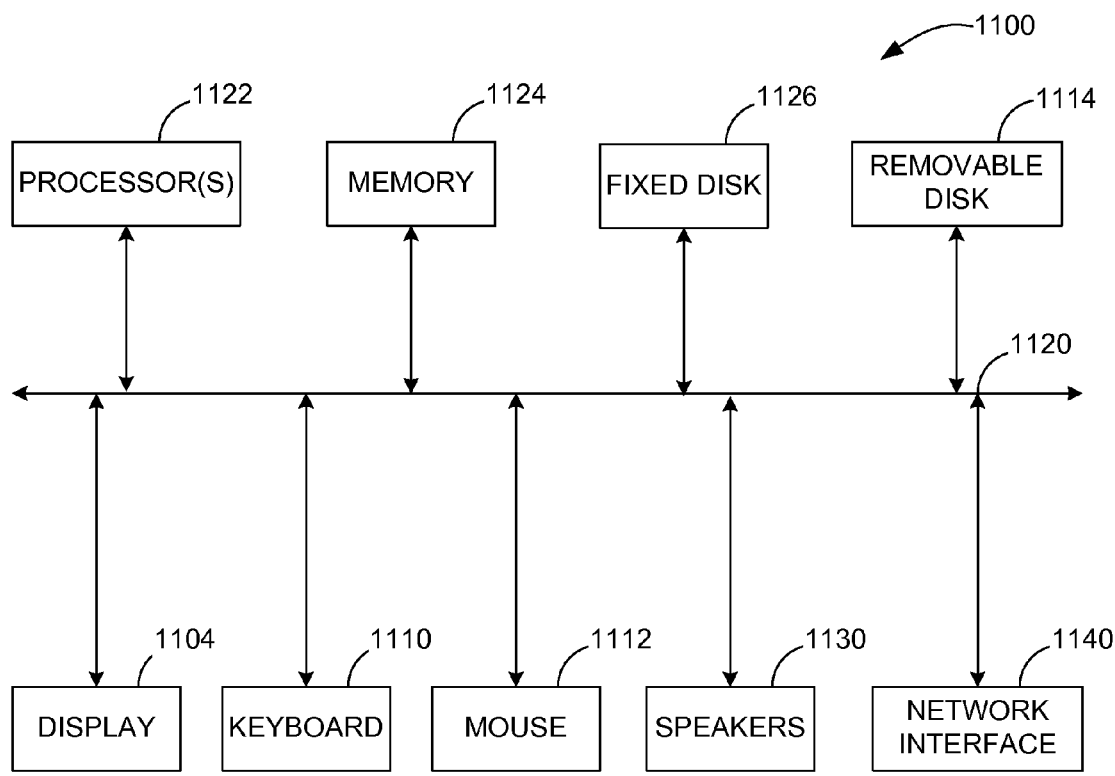

FIGS. 11A and 11B illustrate a computing system 1100 suitable for implementing embodiments of the present invention. FIG. 11A shows one possible physical form of the computing system. Of course, the computing system may have many physical forms including an integrated circuit, a printed circuit board, a small handheld device (such as a mobile telephone, handset or PDA), a personal computer or a super computer. Computing system 1100 includes a monitor 1102, a display 1104, a housing 1106, a disk drive 1108, a keyboard 1110 and a mouse 1112. Disk 1114 is a computer-readable medium used to transfer data to and from computer system 1100.

FIG. 11B is an example of a block diagram for computing system 1100. Attached to system bus 1120 are a wide variety of subsystems. Processor(s) 1122 (also referred to as central processing units, or CPUs) are coupled to storage devices including memory 1124. Memory 1124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1126 is also coupled bi-directionally to CPU 1122; it provides additional data storage capacity and may also include any of the computer-readable media described below. Fixed disk 1126 may be used to store programs, data and the like and is typically a secondary storage medium (such as a hard disk) that is slower than primary storage. It will be appreciated that the information retained within fixed disk 1126, may, in appropriate cases, be incorporated in standard fashion as virtual memory in memory 1124. Removable disk 1114 may take the form of any of the computer-readable media described below.

CPU 1122 is also coupled to a variety of input/output devices such as display 1104, keyboard 1110, mouse 1112 and speakers 1130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1122 optionally may be coupled to another computer or telecommunications network using network interface 1140. With such a network interface, it is contemplated that the CPU might receive information from the network, or might output information to the network in the course of performing the above-described method steps. Furthermore, method embodiments of the present invention may execute solely upon CPU 1122 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method of enabling a network connection between an app on a remote device and a remote server, the method comprising:
    during execution of an application on the remote device, attempting to open the network connection with the remote server;
    intercepting relevant function calls to and from the application, said intercepting done by a sockets interception layer on top of an IP stack specifically for the application, wherein said relevant function calls are re-directed to the sockets interception layer and selected based on socket characteristics;
    correlating said relevant function calls with a particular network connection;
    discerning a certificate by observing data stream between the application and the remote server;
    comparing the certificate with a trust store in the application;
    determining whether the certificate can be trusted; and
    allowing the network connection if the certificate is authenticated and trusted, the network connection between the application and the remote server.

2. A method of enabling a network connection between an application on a mobile device and a remote server, the method comprising:
    intercepting function calls between the application and the remote server;
    examining a function call to determine if the function call is over the network connection;
    determining whether the application is attempting to make the network connection with the remote server;
    observing a data stream between the application and the remote server;
    discerning a certificate by observing the data stream;
    comparing the certificate with a trust store in the application;
    determining whether the certificate is trusted by the application; and
    allowing the network connection with the remote server.

* * * * *